United States Patent
Bui et al.

(10) Patent No.: US 10,972,910 B1
(45) Date of Patent: Apr. 6, 2021

(54) RESTRICTING COMMUNICATION USING OPERATOR DETERMINED BARRING

(71) Applicant: Sprint Spectrum LP, Overland Park, KS (US)

(72) Inventors: Hung Bui, Chantilly, VA (US); Kenneth Lockie, Johns Creek, GA (US); Jonathan Weintraub, Lovettsville, VA (US); Mukesh Agarwal, Wildwood, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 884 days.

(21) Appl. No.: 14/137,743

(22) Filed: Dec. 20, 2013

(51) Int. Cl.
*H04W 12/06* (2009.01)
*H04L 29/06* (2006.01)
*H04W 48/02* (2009.01)

(52) U.S. Cl.
CPC ......... *H04W 12/06* (2013.01); *H04L 63/0892* (2013.01); *H04L 63/10* (2013.01); *H04W 48/02* (2013.01)

(58) Field of Classification Search
CPC ..... H04W 24/08; H04W 36/14; H04W 12/12; H04W 4/16; H04W 60/00; H04W 8/04; H04W 8/12; H04W 8/26; H04W 12/04; H04W 12/08; H04W 16/14; H04W 24/00; H04W 28/0268; H04W 28/0284; H04W 36/0083; H04W 36/22; H04W 36/24; H04W 36/28
USPC ........ 455/411, 450; 370/203, 503, 402, 448, 370/453, 538
See application file for complete search history.

(56) References Cited

U.S. PATENT DOCUMENTS

| | | | |
|---|---|---|---|
| 2005/0176438 A1* | 8/2005 | Li | H04W 12/08 455/450 |
| 2006/0089122 A1* | 4/2006 | Zavalkovsky | H04W 12/08 455/410 |
| 2009/0092111 A1* | 4/2009 | Horn | H04W 48/02 370/338 |
| 2010/0110987 A1 | 5/2010 | Subramanian et al. | |
| 2011/0134851 A1* | 6/2011 | Cortes Gomez | H04W 4/16 370/328 |
| 2011/0269467 A1* | 11/2011 | Leclerc | H04W 48/02 455/436 |
| 2013/0196661 A1* | 8/2013 | Lee | H04W 48/18 455/434 |

* cited by examiner

*Primary Examiner* — Natasha W Cosme (57) ABSTRACT

Systems and methods of operating a wireless communication system are provided. A network node can receive a request from the wireless device to establish communication with the first access node. A network node can receive an indication from an authorization node that a wireless device is not authorized to communicate with a first access node. The network node can transmit a message denying the request to establish communication with the first access node to the wireless device based on the indication from the authorization node. The network node can receive a request from the wireless device to establish communication with a second access node. The network node can determine that the wireless device is authorized to establish communication with the second access node. The network node can transmit a message granting the request to establish communication with the second access node to the wireless device.

18 Claims, 5 Drawing Sheets

RESTRICTING COMMUNICATION USING OPERATOR DETERMINED BARRING

TECHNICAL BACKGROUND

A wireless communication network can include a plurality of access points or access nodes. An access node can be controlled by a single network operator or shared by two or more network operators. When an access node is shared by two or more different network operators, one access node can be associated with a plurality of network identifiers. For example, the access node can advertise a plurality of public land mobile network identifiers (PLMN-IDs).

A wireless device can initiate communication with an access node through automatic PLMN selection mode or manual PLMN selection mode. In an automatic PLMN selection mode, a wireless device can maintain a list of approved PLMN-IDs where the list can rank the PLMN-IDs based on priority criteria. During automatic PLMN selection mode, the wireless device can continually monitor for available PLMN-IDs and automatically select to initiate communication with an access node based on the list of PLMN-IDs stored at the wireless device. In a manual PLMN selection mode, a list of currently available PLMN-IDs can be displayed at the wireless device and a user may select one of the PLMN-IDs from the presented list to initiate communication with the access node associated with the selected PLMN-ID. During manual PLMN selection mode, the wireless device can continue to communicate with the access node associated with the selected PLMN-ID even though PLMN-IDs having a higher priority than the selected PLMN-ID may be available from the list stored at the wireless device.

OVERVIEW

Systems and methods of operating a wireless communication system are provided. A network node can receive a request from a wireless device to establish communication with a first access node. The network node can receive an indication from an authorization node that the wireless device is not authorized to communicate with the first access node. The network node can transmit a message denying the request to establish communication with the first access node to the wireless device based on the indication from the authorization node. The network node can receive a request from the wireless device to establish communication with a second access node. The network node can determine that the wireless device is authorized to establish communication with the second access node. The network node can transmit a message granting the request to establish communication with the second access node to the wireless device. The network node can transmit to the second access node an indication that the wireless device is not authorized to communicate with the first access node.

DETAILED DESCRIPTION

Figure 1:
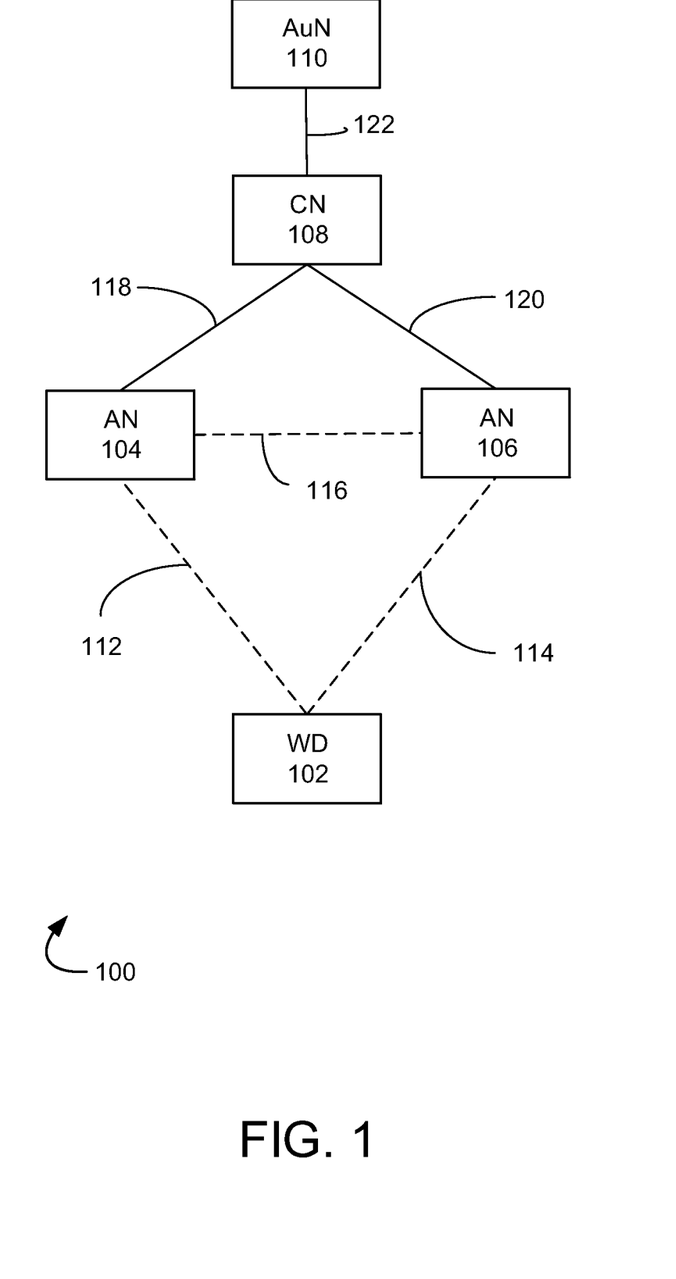
FIG. 1 illustrates an exemplary communication system.

FIG. 1 illustrates an exemplary communication system 100 for providing wireless communication to a wireless device. Communication system 100 can comprise wireless device 102, access nodes 104, 106, controller node 108, and authentication node 110. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between controller node 108 and access nodes 104, 106 which are omitted for clarity, including additional processing nodes, routers, gateways, and physical and/or wireless data links for carrying data among the various network elements. In addition, while not illustrated, access nodes 104, 106, controller node 108, and/or authentication node 110 can be in communication with a communication network.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1, any number of wireless devices can be implemented according to various exemplary embodiments disclosed herein.

The wireless interface of wireless device 102 can include a plurality of transceivers, where each transceiver is associated with a different frequency band. Different frequency bands can be associated with the same or different radio access technologies and/or the same or different network operators. For example, wireless device 102 can include at least one transceiver associated with at least one frequency band of at least one wireless cellular protocol such as code division multiple access (CDMA), global system for mobile communications (GSM), worldwide interoperability for microwave access (WiMAX), long-term evolution (LTE), and/or high-speed downlink packet access (HSDPA), etc.

Wireless device 102 can attempt to establish communication with access node 104 through communication link 112 and/or attempt to establish communication with access node 106 through communication link 114. Links 112, 114 can use various communication media, such as air, space, metal, optical fiber, or some other signal propagation path— including combinations thereof. Communication links 112, 114 may comprise many different signals sharing the same link. Communication links 112, 114 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link 112, but be transferred over different communication sessions, frequencies, timeslots, packets, ports, sockets, logical transport links, or in different directions—including combinations thereof.

Wireless device 102 can establish a communication session via access node 104 or access node 106 to communicate information over system 100 using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access nodes 104, 106 can be any network node configured to provide communications to wireless device 102. For example, access nodes 104, 106 can be selected from a base transceiver station, a radio base station, an eNodeB device, or an enhanced eNodeB device. It is noted that while only one wireless device 102 is illustrated in FIG. 1, any number of wireless devices can be in communication with access nodes 104, 106. Moreover, any number of access nodes can be implemented within system 100. Access nodes 104, 106 can be associated with one or more network operators.

A network operator can be a communications provider that provides access to a network where communications are transmitted over the network. Typically, a network operator owns and operates the nodes within the network. However, a primary network operator (e.g. home network operator) can enter into relationships with other network operators (e.g. roaming or shared network operators) to share resources such as frequency bands, network environments, etc. For example, multiple network providers may operate in a multi-operator core network environment, and can enter into agreements to share frequency bands or other network resources. Frequency band sharing and/or roaming agreements may be limited in scope, and network providers can share resources of the network while not sharing other resources of the network. For example, one network provider can share one frequency band with a second network provider while not sharing resources of another frequency band.

Access nodes 104, 106 can be configured to establish communication sessions with wireless device 102 over one of a plurality of frequency bands and/or using a plurality of radio access technologies where the access nodes 104, 106 can be associated with one or a plurality of network operators. For example, access node 104 can be configured to provide at least one frequency band associated with one network provider. Access node 104 can be further configured to provide at least one frequency band associated with another network provider. Likewise, access node 106 can be configured to provide a frequency band associated with one network provider. Access node 106 can be further configured to provide a frequency band associated with another network provider.

Each frequency band can be the same or different radio access technologies. For example, the radio access technology can include at least one of code division multiple access (CDMA), global system for mobile communications (GSM), worldwide interoperability for microwave access (WiMAX), long-term evolution (LTE), and/or high-speed downlink packet access (HSDPA), etc.

In addition, when an access node is associated with more than one network operator, the access node can communicate a plurality of network identifiers such that each network identifier is associated with each network operator. For example, when access node 104 is associated with a first network operator and a second network operator, access node 104 can advertise a first PLMN-ID that correlates to the first network operator and a second PLMN-ID that correlates to the second network operator.

Access nodes 104, 106 can be further configured to communicate with each other. For example, access nodes 104, 106 can be configured to initiate handovers between access nodes over communication link 116 without initiating communication with another network node such as controller node 108 and/or authentication node 110. In an exemplary embodiment, if wireless device 102 is in communication with access node 104, access node 104 can determine whether to handover wireless device 102 to access node 106. During the handover procedure, access node 104 can provide access node 106 with a list indicative of access nodes with which wireless device 102 is approved to communicate over link 116. The list indicative of the approved access nodes can include PLMN-IDs of approved access nodes or the list can include PLMN-IDs of access nodes with which wireless device 102 is restricted from initiating communication.

Access nodes 104, 106 can comprise a processor and associated circuitry to execute or direct the execution of computer-readable instructions to obtain information. Access nodes 104, 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 106 can receive instructions and other input at a user interface.

Controller node 108 can be any network node configured to communicate information or control information over system 100. Controller node 108 can be a standalone computing device, computing system, or network component, and can be accessible, for example, by a wired or wireless connection, or through an indirect connection such as through a computer network or communication network. For example, controller node 108 can include a mobility management entity (MME), a serving gateway (SGW), a public data network gateway (PGW), etc. One of ordinary skill in the art would recognize that controller node 108 is not limited to any specific technology architecture, such as Long Term Evolution (LTE) and can be used with any network architecture and/or protocol.

Controller node 108 can comprise a processor and associated circuitry to execute or direct the execution of computer-readable instructions to obtain information. Controller node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 108 can receive instructions and other input at a user interface.

Controller node 108 can be in communication with access node 104 through communication link 118, with access node 106 through communication link 120, and with authentication node 110 through communication link 122. Communication links 118, 120, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 118, 120, 122 can be a direct link or might include various equipment, intermediate components, systems, and networks.

Authentication node 110 can be any network node configured to authenticate network access to wireless device 102. Authentication node 110 can be a standalone computing device, computing system, or network component, and can be accessible, for example, by a wired or wireless connection, or through an indirect connection such as through a computer network or communication network. For example, authentication node 110 can include a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that authentication node 110 is not limited to any specific technology architecture, such as Long Term Evolution (LTE) and can be used with any network architecture and/or protocol.

Authentication node 110 can comprise a processor and associated circuitry to execute or direct the execution of computer-readable instructions to obtain information. Authentication node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Authentication node 110 can receive instructions and other input at a user interface.

In operation, a wireless device 102 can be configured to communicate with access nodes 104, 106. However, authentication node 110 can identify certain access nodes in which wireless device 102 is not authorized to establish communication. For example, wireless device 102 can be provisioned within a data base of authentication node 110 such that a restricted flag is associated with wireless device 102. In an embodiment, this state associated with wireless device 102 can be maintained by automation during provision updates to the authentication node 110.

In an explary embodiment, wireless device 102 can request to initiate communication with access node 104. After controller node 108 receives the request from access node 104, controller node 108 can send an inquiry to authentication 110 to determine whether wireless device 102 is authorized to initiate communication with access node 104.

Authentication node 110 can send an indication to controller node 108 indicating that wireless device 102 is not authorized to establish communications with a designated access node. In an exemplary embodiment, the indication message sent from authorization node 110 can comprise at least one restricted operator determined barring (ODB) bit such that the ODB bit is indicative of restricting wireless device 102 from establishing communication with access node 104. The restricted ODB bit can be selected from an unused ODB bit. It is noted that the restricted ODB bits used in the message from the authentication node 110 to the controller node 108 are different from the ODB bits identified within the communication protocol. In an exemplary embodiment, the restricted ODB bits can be comprised in the last two octets of a regional subscriber zone identification message.

The indication that wireless device 102 is not authorized to establish communication with a designated access node can be based on a network identifier such as a PLMN-ID of access node 104. Controller node 108 can determine a restricted access node list for the wireless device 102 based on the network identifier. For example, the controller node 108 can map the restricted ODB bit into a restricted PLMN-ID list such that the restricted PLMN-ID list is indicative of a list of access nodes the wireless device 102 is restricted from accessing. The list can include a list of all PLMN-IDs that the wireless device 102 is restricted from accessing or the list can include a list of only PLMN-IDs with which the wireless device 102 is authorized to initiate communication.

When access node 104 is identified as a restricted access node based on the indication from the authorization node 110, controller node 108 can determine that wireless device 102 is restricted from establishing communication with access node 104 based on the indication from authentication node 110 and deny the request from wireless device 102 to establish communication with access node 104.

Alternatively, if an access node is approved for establishing communication with wireless device 102 such as access node 106, when wireless device 102 requests to establish communication with access node 106, controller node 108 can determine that access node 106 is an approved access node and grant the request to establish communication.

In an exemplary embodiment, controller node 108 can send a message to approved access nodes, such as access node 106, indicating that wireless device 102 is restricted from accessing restricted access nodes such as 104. When the approved access nodes have a list of access nodes that wireless device 102 is restricted from accessing, the approved access nodes can prevent initiating a handover of wireless device 102 to a restricted access node.

Figure 2:
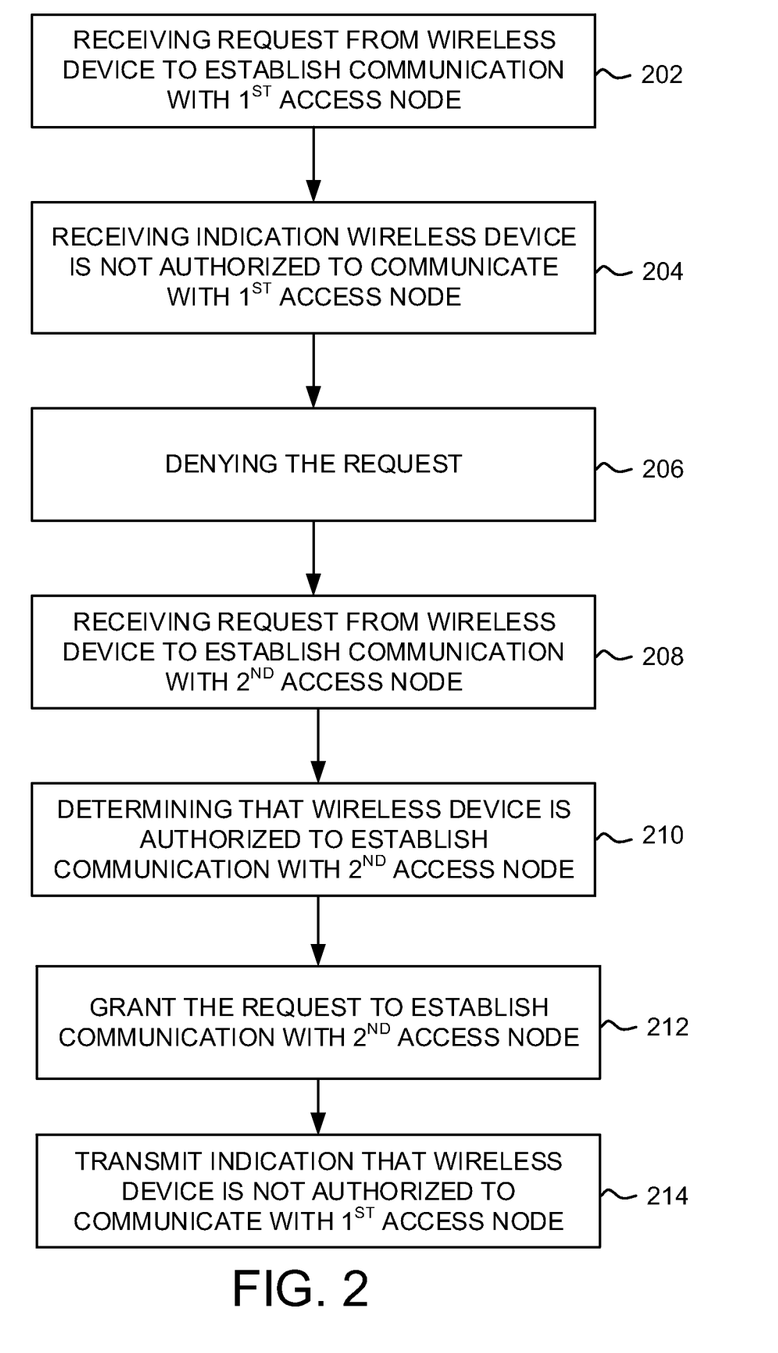
FIG. 2 illustrates an exemplary method of communicating with a wireless device in a communication system.

FIG. 2 illustrates a flow chart of an exemplary method of operating a wireless communication system. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At 202, a network node can receive a request from a wireless device to establish communication with a first access node. For example, wireless device 102 can send a request to control node 108 to establish communication with access node 104.

A network node can receive an indication that the wireless device is not authorized to communication with a particular access node at 204. For example, controller node 108 can inquire whether wireless device 102 has authorization to initiate communication with access node 104 and authentication node 110 can send an indication to controller node 108 comprising an ODB bit indicative of whether wireless device 102 is restricted from establishing communication with access node 104. The authentication node 110 can determine whether wireless device 102 is authorized to establish communication with access node 104 based on a network identifier of access node 104.

A network node can deny the request at 206 when the wireless device is not authorized to establish communication with the selected access node. For example, controller node 108 can deny the request from wireless device 102 to establish communication with access node 104 based on the indication from authorization node 110.

The wireless device can then attempt to establish communication with a second access node and the network node can receive the request from the wireless device at 208. For example, controller node 108 can receive a request from wireless device 102 to establish communication with access node 106.

After determining that the wireless device is authorized to establish communication with the second access node at 210, the network node can grant the request at 212. For example, controller node 108 can determine that access node 106 is an authorized access node associated with wireless device 102 based on an indication from authorization node 110. When controller node 108 determines that wireless device 102 is authorized to establish communication with access node 106, controller node 108 can grant the request such that the wireless device 102 initiates communication with access node 106.

The network node can also transmit an indication that the wireless device is not authorized to communicate with the first access node at 214. For example, controller node 108 can send instructions to access node 106 to update the list indicative of approved access nodes with which wireless device 102 is authorized to establish communication. When access node 106 initiates handing over wireless device 102 to another access node, access node 106 can omit access node 104 from possible target access nodes based on the updated list. Alternatively, wireless device 102 can receive the indication that it is not authorized to communicate with the first access node and update a list of approved access nodes stored at the wireless device.

Figure 3:
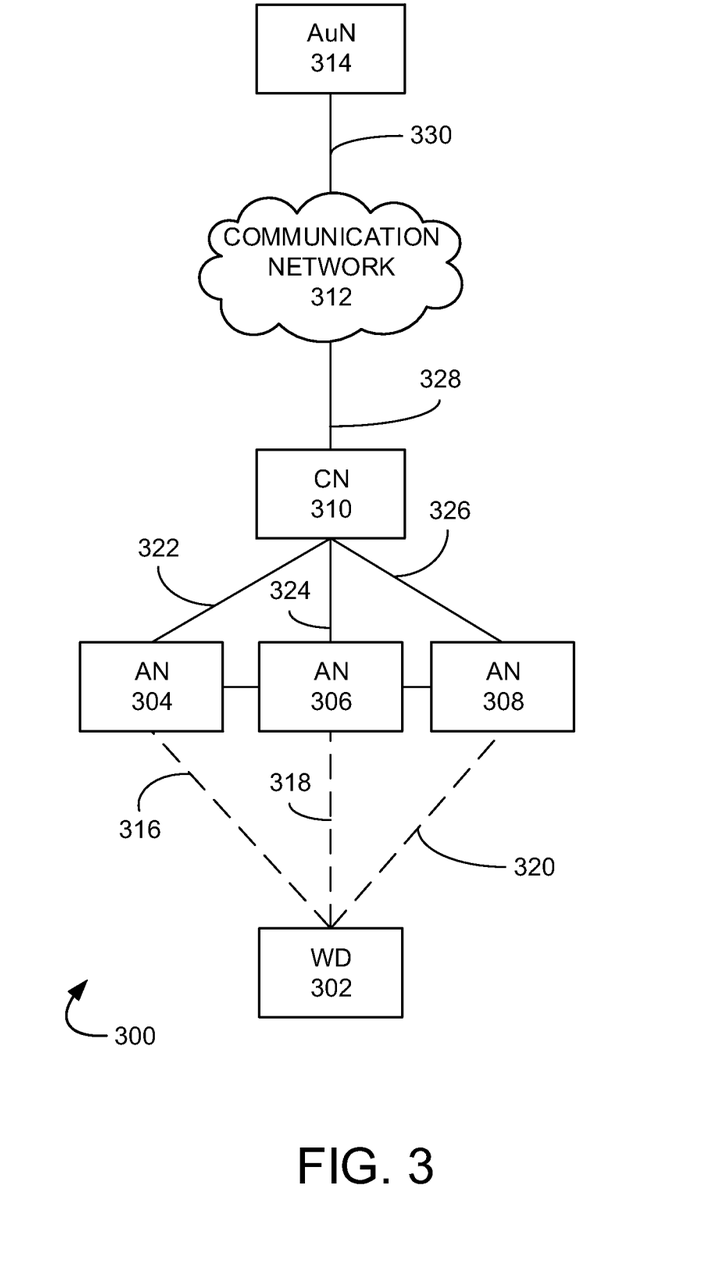
FIG. 3 illustrates another exemplary communication system.

FIG. 3 illustrates an exemplary communication system 300 for providing wireless communication to a wireless device. Communication system 300 can comprise wireless device 302, access nodes 304, 306, 308, controller node 310, communication network 312, and authentication node 314. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication between controller node 310, access nodes 304, 306, 308, and/or authentication node 314 which are omitted for clarity, including additional processing nodes, routers, gateways, and physical and/or wireless data links for carrying data among the various network elements.

Wireless device 302 can be any device configured to communicate over communication system 300 using a wireless interface. For example, wireless device 302 can include a cell phone, a smart phone, a computing platform such as a laptop, palmtop, or a tablet, a personal digital assistant, or an internet access device, and combinations thereof. It is noted that while one wireless device is illustrated in FIG. 3, any number of wireless devices can be implemented according to various exemplary embodiments disclosed herein.

The wireless interface of wireless device 302 can include a plurality of transceivers, where each transceiver is associated with a different frequency band. Different frequency bands can be associated with the same or different radio access technologies and/or the same or different network operators. For example, wireless device 302 can include at least one transceiver associated with at least one frequency band of at least one wireless cellular protocol such as code division multiple access (CDMA), global system for mobile communications (GSM), worldwide interoperability for microwave access (WiMAX), long-term evolution (LTE), and/or high-speed downlink packet access (HSDPA), etc.

Wireless device 302 can attempt to establish communication with access node 304 through communication link 316, attempt to establish communication with access node 306 through communication link 318, and/or attempt to establish communication with access node 308 through communication link 320. Links 316, 318, 320 can use various communication media, such as air, space, metal, optical fiber, or some other signal propagation path—including combinations thereof. Communication links 316, 318, 320 may comprise many different signals sharing the same link. Communication links 316, 318, 320 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 302 and access node 304 could share the same representative wireless link 316, but be transferred over different communication sessions, frequencies, timeslots, packets, ports, sockets, logical transport links, or in different directions—including combinations thereof.

Wireless device 302 can establish a communication session via access node 304, access node 306, or access node 308 to communicate information over system 300 using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access nodes 304, 306, 308 can be any network node configured to provide communication to wireless device 302. For example, access nodes 304, 306, 308 can be selected from a base transceiver station, a radio base station, an eNodeB device, or an enhanced eNodeB device. It is noted that while only one wireless device 302 is illustrated in FIG. 3, any number of wireless devices can be in communication with access nodes 304, 306, 308. Moreover, any number of access nodes can be implemented within system 300. Access nodes 304, 306, 308 can be associated with one or more network operators.

A network operator can be a communications provider that provides access to a network where communications are transmitted over the network. Typically, a network operator owns and operates the nodes within the network. However, a primary network operator (e.g. home network operator) can enter into relationships with other network operators (e.g. roaming network operators) to share resources such as frequency bands, network environments, etc. For example, multiple network providers may operate in a multi-operator core network environment, and can enter into agreements to share frequency bands or other network resources. Frequency band sharing and/or roaming agreements may be limited in scope, and network providers can share resources of the network while not sharing other resources of the network. For example, one network provider can share one frequency band with a second network provider while not sharing resources of another frequency band.

Access nodes 304, 306, 308 can be configured to establish communication sessions with wireless device 302 over one of a plurality of frequency bands and/or using a plurality of radio access technologies where the access nodes 304, 306, 308 can be associated with one or a plurality of network operators. For example, access node 304 can be configured to provide at least one frequency band associated with one network provider. Access node 304 can be further configured to provide at least one frequency band associated with another network provider. Likewise, access nodes 306, 308 can be configured to provide at least one frequency band associated with at least one network provider.

Each frequency band can be the same or different radio access technologies. For example, the radio access technology can include at least one of code division multiple access (CDMA), global system for mobile communications (GSM), worldwide interoperability for microwave access (WiMAX), long-term evolution (LTE), and/or high-speed downlink packet access (HSDPA), etc.

In addition, when an access node is associated with more than one network operator, the access node can communicate a plurality of network identifiers such that each network identifier is associated with each network operator. For example, when access node 304 is associated with a first network operator and a second network operator, access node 304 can advertise a first PLMN-ID that correlates to the first network operator and a second PLMN-ID that correlates to the second network operator.

While illustrated but not labeled for clarity, access nodes 304, 306, 308 can be further configured to communicate with each other over communication links. For example, access nodes 304, 306, 308 can be configured to initiate handovers between access nodes over the communication links without initiating communication with another network node such as controller node 310 and/or authentication node 314. In an exemplary embodiment, if wireless device 302 is in communication with access node 304, access node 304 can determine to initiate handover procedures to access node 306 and/or access node 308. During the handover procedure, access node 304 can provide access node 306 and/or 308 with a list indicative of access nodes with which wireless device 302 is approved to initiate communication. The list indicative of the approved access nodes can include PLMN-IDs of approved access nodes or the list can include PLMN-IDs of access nodes with which wireless device 302 is restricted from initiating communication.

Access nodes 304, 306, 308 can comprise a processor and associated circuitry to execute or direct the execution of computer-readable instructions to obtain information. Access nodes 304, 306, 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 304, 306, 308 can receive instructions and other input at a user interface.

Controller node 310 can be any network node configured to communicate information or control information over system 300. Controller node 310 can be a standalone computing device, computing system, or network component, and can be accessible, for example, by a wired or wireless connection, or through an indirect connection such as through a computer network or communication network. For example, controller node 310 can include a mobility management entity (MME), a serving gateway (SGW), a public data network gateway (PGW), etc. One of ordinary skill in the art would recognize that controller node 310 is not limited to any specific technology architecture, such as Long Term Evolution (LTE) and can be used with any network architecture and/or protocol.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 310 can receive instructions and other input at a user interface.

Controller node 310 can be in communication with access node 304 through communication link 322, with access node 306 through communication link 324, with access node 308 through communication link 326 and communication network 312 through communication link 328. Authorization node 314 can be in communication with communication network 312 through communication link 330. Communication links 322, 324, 326, 328, 330 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 322, 324, 326, 328, 330 can be a direct link or might include various equipment, intermediate components, systems, and networks.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 can be capable of carrying data, for example, to support voice and data communications by a wireless device such as wireless devices 102,104, 106. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 can also comprise additional base stations, controller nodes, telephony switches, internet routers, network gateways, computer systems, communication links, or some other type of communication equipment, and combinations thereof.

Authentication node 314 can be any network node configured to authenticate network access to wireless device 302. Authentication node 314 can be a standalone computing device, computing system, or network component, and can be accessible, for example, by a wired or wireless connection, or through an indirect connection such as through a computer network or communication network. For example, authentication node 314 can include a Home Subscriber Server (HSS), a Policy Control and Charging Rules Function (PCRF), an authentication, authorization, and accounting (AAA) node, a rights management server (RMS), a subscriber provisioning server (SPS), a policy server. One of ordinary skill in the art would recognize that authentication node 314 is not limited to any specific technology architecture, such as Long Term Evolution (LTE) and can be used with any network architecture and/or protocol.

Authentication node 314 can comprise a processor and associated circuitry to execute or direct the execution of computer-readable instructions to obtain information. Authentication node 314 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Authentication node 314 can receive instructions and other input at a user interface.

In operation, a wireless device 302 can be configured to communicate with access nodes 304, 306, 308. However, an entity, such as a network operator, can determine that wireless device 302 can be restricted from establishing communication with certain access nodes based on a criteria. For example, the network operator can determine that wireless device 302 is not authorized to establish communication with an access node using a particular network identifier based on a subscriber priority or an emergency services priority. In an exemplary embodiment, restriction bits In an exemplary embodiment, an access node such as access node 304 can comprise at least one frequency band associated with a first network operator and at least one frequency band associated with a second network operator. Access node 304 can advertise different network identifiers associated with each frequency band. For example, a first network identifier can be associated with a first frequency band of the first network operator and a second network identifier can be associated with a second frequency band of the second network operator, where the first network identifier and the second network identifier are different. The network identifiers can be for example PLMN-IDs. One of ordinary skill in the art would appreciate that all access nodes 304, 306, 308 can be associated with one or more network identifiers.

Wireless device 302 can be configured to establish communication with an access node though an automatic network identifier selection mode or a manual network identifier selection mode. In the automatic network identifier selection mode, wireless device 302 can maintain a list indicative of approved network identifiers where the list can be ranked based on a predetermined priority criteria. For example, the list can comprise a list of all approved network identifiers of access nodes with which wireless device 302 is authorized to establish communication. Alternatively, the list can comprise a list of all restricted network identifiers of access nodes with which wireless device 302 is restricted from establishing communication. Wireless device 302 can receive the list of approved network identifiers from controller node 310 after wireless device 302 successfully establishes communication with an access node where this list can be periodically updated. When wireless device 302 initiates communication with access node 304 using the automatic network identifier selection mode, wireless device 302 can initiate communication with authorized network identifiers, where the authorized network identifiers can be associated with one or more access nodes. Typically, wireless device 302 is unable to initiate communication with an unauthorized network identifier for an access node when using the automatic network identifier selection mode. However, when wireless device 302 initiates an attachment attempt for the first time over system 300 and wireless device 302 recognizes the network identifier, wireless device 302 can attempt to establish communication with the associated access node. The system 300 will reject the request and instruct wireless device 302 to identify this network identifier as restricted.

When wireless device 302 initiates communications with an access node through manual network identifier selection mode, a list of all advertised network identifiers are provided to the wireless device 302. For example, a list of all network identifiers currently detected by the wireless device 302 can be displayed to a user of the wireless device. When there are a plurality of network identifiers to select from, the user can input a selection of the network identifier with which the user would like to initiate communication. When wireless device 302 operates in the manual network identifier selection mode, the wireless device can continue to communicate with the access node associated with the selected network identifier even though other network identifiers stored at the wireless device 302 may have higher priority than the selected network identifier.

In an exemplary embodiment, the wireless device 302 can be operating in a manual network identifier selection mode and detect a plurality of network identifiers. For example, access node 304 can advertise two PLMN-IDs such as 30 and 11. Access node 306 can advertise a PLMN-ID of 1 and access node 308 can advertise two PLMN-IDs such as 30 and 21. Wireless device 302 can detect all of the advertised network identifiers of access nodes 304, 306, 308 and display an indication of the network identifiers to a user. The indication of the network identifiers can include alphanumeric characters and/or symbols. The user can manually select one of the listed indications of the network identifiers and input the selection at the wireless device 302. For example, a user can select the indication associated with PLMN-ID 11 advertised by access node 304. Wireless device 302 can request to establish communication with access node 304 using PLMN-ID 11 and access node 304 can transmit that request to controller node 310.

Controller node 310 can then inquire whether the wireless device 302 has authorization to initiate communication with the access node associated with the selected network identifier. Specifically, controller node 310 can send a message to authentication node 314 to determine whether wireless device 302 is authorized to initiate communication with access node 304. Authentication node 314 can determine whether wireless device has authorization to initiate communication with access node 304 based on predetermined network operator provisioning. This determination can be done in various ways. For example, authentication node 314 can compare the network identifier of access node 304 to a predetermined list or look-up table.

When the authentication node 314 determines that wireless device is restricted from accessing access node 304 using the selected network identifier, authentication node 314 can transmit an indication that wireless device is not authorized to communicate with access node 304. The indication can comprise at least one ODB bit such that the ODB bit is indicative of restricting wireless device 302 from establishing communication with access node 304 using the selected network identifier.

After receiving the restriction indication from authentication node 314, controller node 310 can send a message denying the request from the wireless device 302 to establish communication with access node 304 using the selected network identifier. Controller node 310 can further instruct wireless device 302 to update the list stored at the wireless device 302 where the list is indicative of access nodes wireless device 302 is restricted from accessing.

In addition, controller node 310 can determined a restricted access node list for the wireless device 302 based on the network identifier. For example, the controller node 310 can map the restricted ODB bit received in the indication from the authorization node 314 to a restricted network identifier list such that the restricted network identifier list is indicative of a list of network identifiers that wireless device 302 is restricted from accessing.

After receiving the message denying the request to establish communication with access node 304, wireless device 302 can initiate communications with access node 306. Controller node 310 can receive the request and determine whether access node 306 is an authorized access node for wireless device 302 by sending an inquiry to authentication ode 314. Authentication node 314 can send an indication to controller node 310 indicating that wireless device 302 is authorized to establish communication with access node 306. Controller node 310 can then grant wireless device 302 authorization to initiate communication with access node 306. In addition, controller node 310 can transmit the list of restricted access nodes associated with wireless device 302 to access node 306 to prevent access node 306 from transferring wireless device to the restricted network identifier associated with access node 304 during handover procedures.

Access node 306 can determine that a handover is necessary and when access node 308 is an authorized access node, access node 306 can initiate handover procedures with access node 308 in order to handover wireless device 302 to access node 308. Access node 306 can further transmit the list of authorized access nodes associated with wireless device 302 to access node 308.

Figure 4:
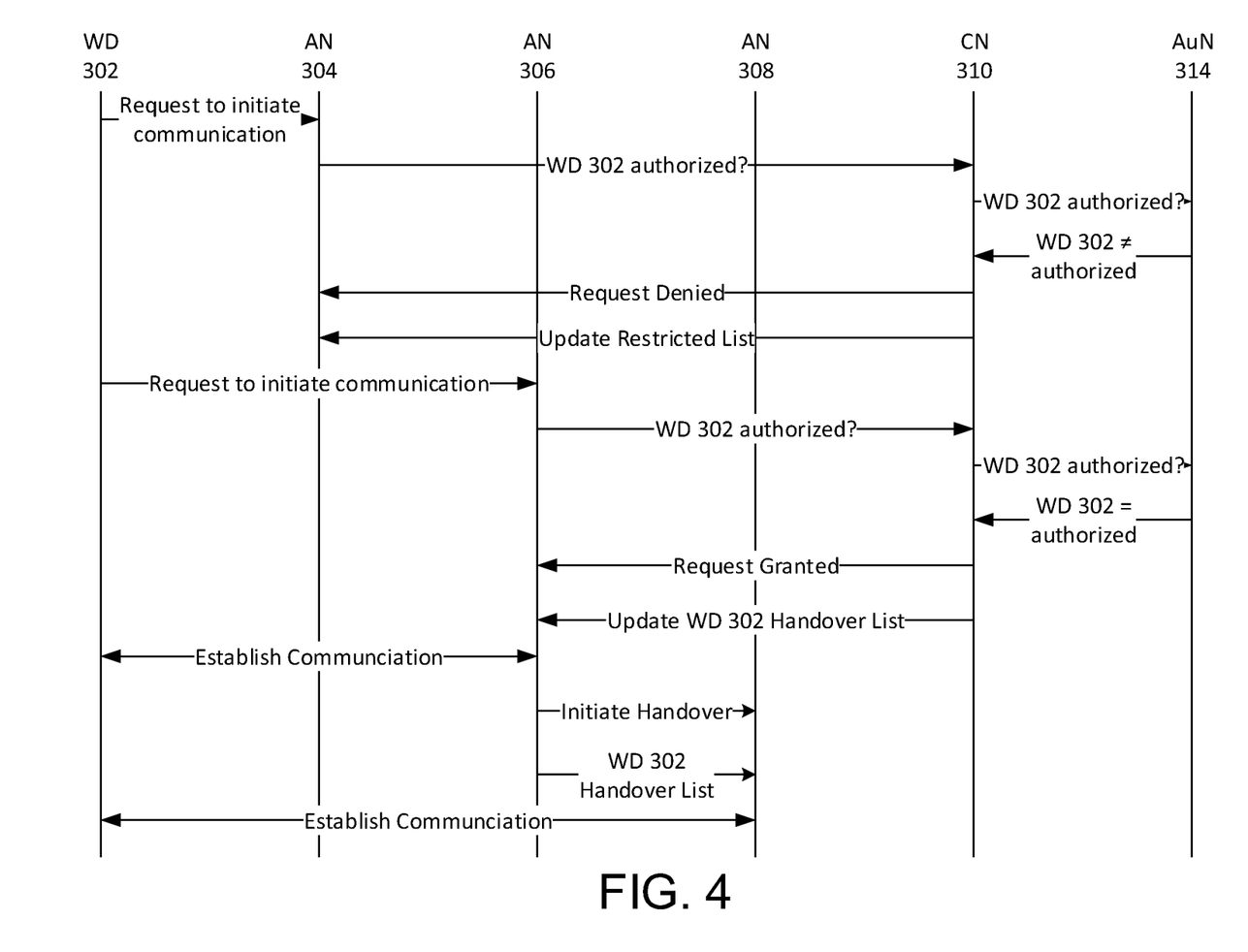
FIG. 4 illustrates an exemplary signaling diagram that illustrates an exemplary method of communicating with a wireless device in a communication system.

FIG. 4 is an exemplary signaling diagram that illustrates an exemplary method for providing wireless communications to a wireless device. The signal diagram will be discussed with reference to the exemplary communication system 300 illustrated in FIG. 3. However, the signaling diagram can be implemented with any suitable communication system. In addition, although FIG. 4 depicts signaling performed in a particular order for purposes of illustrated and discussion, the signaling discussed herein is not limited to any particular order. Moreover, additional signaling not included in FIG. 4 can also be performed.

Wireless device 302 can request to initiate communication with access node 304. This request can be initiated automatically or manually selected by a user of the wireless device 302. Access node 304 can then send a message to controller node 310 to determine whether wireless device 302 is authorized to establish communication with access node 304. Controller node 310 can then send a message to authorization node 314 to determine whether wireless device 302 is authorized to establish communication with access node 304. When authorization node 314 transmits an indication to controller node 310 that wireless device 302 is not authorized to establish communication with access node 304 based on the selected network identifier, controller node 310 can deny the request. In an exemplary embodiment, controller node 310 can further instruct wireless device 302 to update the list of restricted access nodes maintained at the wireless device based on the message to deny the request to initiate communication with access node 304.

Wireless device 302 can further request to initiate communication with access node 306. This request can be initiated automatically or manually. Access node 306 can then send a message to controller node 310 to determine whether wireless device 302 is authorized to establish communication with access node 306. Controller node 310 can send a message to authorization node 314 to determine whether wireless device 302 is authorized to establish communication with access node 306. When authorization node 314 transmits an indication to controller node 310 that wireless device 302 is authorized to establish communication with access node 306 based on the selected network identifier, controller node 310 can grant the request. In addition, controller node 310 can update a list of restricted access nodes associated with wireless device 302 (e.g. a handover list) and send that list to access node 306.

Wireless device 302 can establish communication with access node 306. Access node 306 can then determine to perform a handover to an access node with which wireless device 302 is approved to establish communication such as access node 308. Access node 306 can initiate the handover procedure with access node 308 and send the list of restricted access nodes associated with wireless device 302 (e.g. a handover list). Following the handover procedures, wireless device 302 can discontinue communication with access node 306 and establish communication with access node 308.

Figure 5:
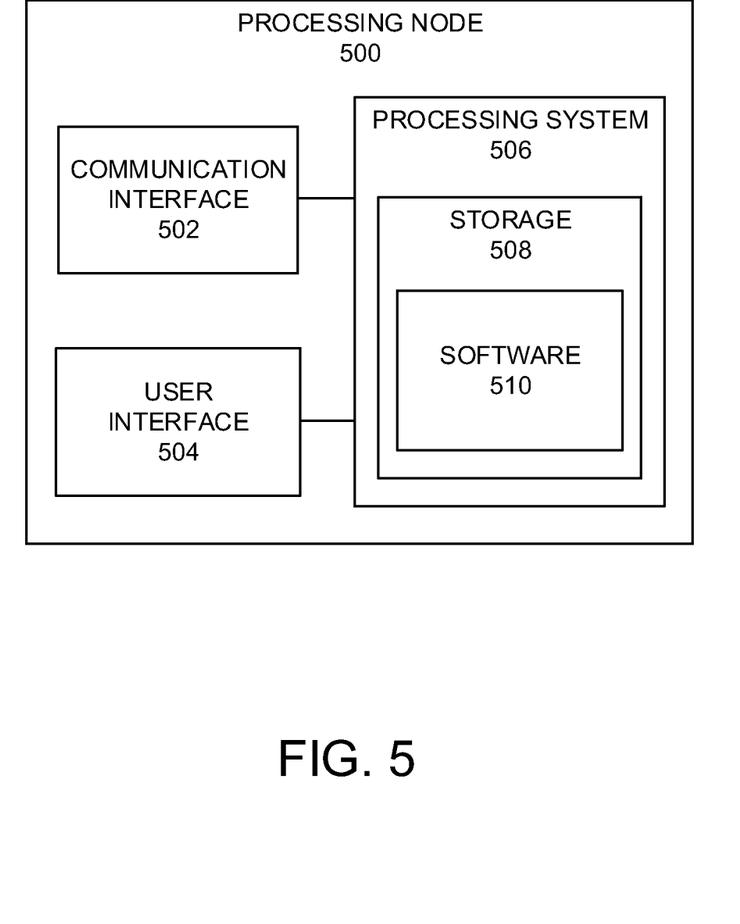
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 104, 106, 304, 306, 308, controller nodes 108, 310, and authentication nodes 110, 314. Processing node 500 can also be an adjunct or component of a network element, such as an element of access nodes 104, 106, 304, 306, 308, controller nodes 108, 310, and authentication nodes 110, 314. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   receiving at a network node a request from a wireless device to establish communication with a first access node;
   receiving at the network node an indication from an authorization node that the wireless device is not authorized to communicate with the first access node;
   transmitting from the network node to the wireless device a message denying the request to establish communication with the first access node based on the indication from the authorization node;
   receiving at the network node a request from the wireless device to establish communication with a second access node;
   determining at the network node that the wireless device is authorized to establish communication with the second access node;
   transmitting from the network node to the wireless device a message granting the request to establish communication with the second access node;
   transmitting from the network node to the second access node an indication that the wireless device is not authorized to communicate with the first access node; and
   based on the indication, instructing the second access node not to handover the wireless device from the second access node to the first access node.

2. The method of claim 1, wherein the indication from the authorization node further comprises at least one operator determined barring (ODB) bit.

3. The method of claim 1, further comprising
   updating a restricted access node list associated with the wireless device maintained at the network node based on the indication from the authorization node.

4. The method of claim 1, wherein the request from the wireless device to establish communication with first access node is initiated by the wireless device based on input received at the wireless device.

5. The method of claim 1, further comprising
   instructing the wireless device to update a restricted access node list maintained at the wireless device based on the message denying the request to establish communication with the first access node.

6. The method of claim 1, wherein the indication that the wireless device is not authorized to communicate with the first access node is based on at least one operator defined criteria.

7. The method of claim 1, wherein the request to establish communication with the first access node is based on a network identifier associated with the first access node.

8. The method of claim 7, wherein the request to establish communications with the first access node is based on a selected network identifier, where the first access node is associated with a plurality of network identifiers.

9. The method of claim 8, wherein the plurality of network identifiers are displayed at the wireless device and the selected network identifier is selected from the plurality of network identifiers displayed at the wireless device.

10. The system of claim 1, wherein the indication that the wireless device is not authorized to communicate with the first access node is based on at least one operator defined criteria.

11. A wireless communication system comprising:
    a processing node configured to
       receive a request from a wireless device to establish communications with a first access node;
       receive an indication from an authorization node that the wireless device is not authorized to communicate with the first access node;
       transmitting from the network node to the wireless device denying the request based on the indication from the authorization node;
       receive at the network node a request from the wireless device to establish communication with a second access node;
       determine at the network node that the wireless device is authorized to establish communication with the second access node;
       transmit to the wireless device a message granting the request to establish communication with the second access node;
       transmit to the second access node an indication that the wireless device is not authorized to communicate with the first access node; and
       based on the indication, instruct the second access node not to handover the wireless device from the second access node to the first access node.

12. The system of claim 11, wherein the indication from the authorization node further comprises at least one operator determined barring (ODB) bit.

13. The system of claim 11, wherein the processing node is further configured to
    update a restricted access node list associated with the wireless device maintained at the network node based on the indication from the authorization node.

14. The system of claim 11, wherein the request from the wireless device to establish communication with first access node is initiated by the wireless device based on input received at the wireless device.

15. The system of claim 11, wherein the processing node is further configured to
    instruct the wireless device to update a restricted access node list maintained at the wireless device based on the message denying the request to establish communications with the first access node.

16. The system of claim 11, wherein the request to establish communications with the first access node is based on the network identifier of the first access node.

17. The system of claim 16, wherein the request to establish communications with the first access node is based on a selected network identifier, where the first access node is associated with a plurality of network identifiers.

18. The system of claim 17, wherein the plurality of network identifiers are displayed at the wireless device and the selected network identifier is selected from the plurality of network identifiers displayed at the wireless device.

\* \* \* \* \*